US008780772B2

United States Patent
Liu et al.

(10) Patent No.: US 8,780,772 B2
(45) Date of Patent: Jul. 15, 2014

(54) COMMUNICATION PROTOCOL FOR WIRELESS ENHANCED CONTROLLER AREA NETWORKS

(75) Inventors: Yong Liu, Santa Clara, CA (US); Chiu Ngo, San Francisco, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1010 days.

(21) Appl. No.: 12/422,128

(22) Filed: Apr. 10, 2009

(65) Prior Publication Data

US 2010/0260102 A1    Oct. 14, 2010

(51) Int. Cl.
*H04B 7/00*    (2006.01)
(52) U.S. Cl.
USPC .......................................... 370/310; 370/431
(58) Field of Classification Search
None
See application file for complete search history.

(56) References Cited

U.S. PATENT DOCUMENTS 7,469,177 B2 * 12/2008 Samad et al. .................... 701/54
7,673,030 B2 *  3/2010 Hite et al. ...................... 709/223
2005/0105560 A1 *  5/2005 Mann et al. .................... 370/503
2005/0249231 A1 * 11/2005 Khan ............................. 370/428
2009/0161678 A1 *  6/2009 Huang et al. ................ 370/395.5
2012/0243438 A1 *  9/2012 Steiner et al. ................. 370/254

OTHER PUBLICATIONS

A. Kutlu et al., "Performance Analysis of MAC Protocols for Wireless Control Area Network," 1996. Proceedings. Second International Symposium on (0-8186-7460-1). pp. 494-499.*
Technical Committee ISO/TC 22 Road Vehicles, Sub-Committee SC 3, Electrical and Electronic Equipment, Chapters 6 and 10 of the ISO 11898 Draft: Controller Area Network (CAN) Standard, International Organization for Standardization, 98 pages, Oct. 1999, USA.

* cited by examiner

*Primary Examiner* — Kevin C Harper
(74) *Attorney, Agent, or Firm* — Kenneth L. Sherman, Esq.; Michael Zarrabian, Esq.; Sherman & Zarrabian LLP

(57) ABSTRACT

A method and system for communication in a wireless enhanced control area network including wireless station nodes is provided. One implementation involves each wireless station node employing a wireless communication protocol for wireless communication of control area network (CAN) messages among the wireless station nodes on a wireless communication medium, wherein each CAN message comprises a content-identified data message or an error message. The wireless communication protocol including a medium access control protocol for controlling access to the wireless communication by the wireless station nodes.

28 Claims, 10 Drawing Sheets

COMMUNICATION PROTOCOL FOR WIRELESS ENHANCED CONTROLLER AREA NETWORKS

FIELD OF THE INVENTION

The present invention relates to wireless communication systems and in particular to Wireless Enhanced Controller Area Networks (WeCAN).

BACKGROUND OF THE INVENTION

Controller Area Network (CAN) communication systems are wired systems widely accepted for their high performance and reliability, and are gaining widespread popularity in robot applications. A CAN network comprises a serial bus network of microcontrollers that connects devices, sensors and actuators in a system or sub-system for real-time control applications. The CAN bus is a vehicle bus standard that allows microcontrollers in devices to communicate therebetween without relying on a host. One example application is HERMES, a humanoid robot developed by the Intelligent Robot laboratory at the University of Munich. A CAN bus is used to connect all modules of the humanoid system.

FIG. 1 shows an example CAN network 10 including multiple nodes (M) 11 connected via a CAN bus 12. The CAN nodes do not utilize information about system configuration (e.g., node addresses). Instead of an addressing scheme, messages are broadcast to all the nodes in the network using an identifier unique to the network. Based on the identifier, the individual nodes decide whether or not to process a message and also determine the priority of the message in terms of competition for bus access. Additional CAN nodes can be added to the CAN network without the need for reprogramming existing CAN nodes to recognize the additions. In the network 10, the nodes are wired to the CAN bus 12, which in turn is wired to other system components such as a host computer.

BRIEF SUMMARY OF THE INVENTION

The present invention provides a method and system for communication in a wireless enhanced control area network including wireless station nodes. One embodiment involves: each wireless station node employing a wireless communication protocol for wireless communication of control area network (CAN) messages among the wireless station nodes on a wireless communication medium, wherein each CAN message may comprise a content-identified data message or an error message. The wireless communication protocol including a medium access control protocol for controlling access to the wireless communication medium by the wireless station nodes. Each content-identified CAN message may include an identification indicating the content type of the message for message filtering to determine processing of the message.

The protocol may further include: a transmitting node transmitting a data message on the wireless communication medium; upon a receiving node receiving the data message correctly, then the receiving node utilizing a message filter to determine processing of the message based on the message identification; and upon a receiving node receiving the data message incorrectly, then the receiving node backing off the wireless medium a random time period and then transmitting an error message on the wireless communication medium, wherein an error message from a node suppresses error messages from all other nodes.

The protocol may further include: upon completing a data message transmission, a transmitting node entering a silent period during which if the transmitting node receives an error message, then after the silent period the transmitting node retransmits the data message over the wireless communication medium, otherwise the transmitting node decides that the data message was received correctly by the receiving nodes.

The protocol may further include: a transmitting node retransmitting a data message until all other nodes receive the message correctly; wherein upon completing a data message transmission and deciding that all other nodes received the data message correctly, a transmitting node may transmit a new data message after a silent period.

The network may further comprise a hierarchical network, wherein the nodes include coordinator nodes and basic nodes, the protocol further including: a basic node associating with a coordinator node; and upon receiving a message from an associated basic node, said coordinator retransmitting the message to other nodes in the network. The protocol may further include: said coordinator selecting a backup coordinator node; and said coordinator passing information of each associated basic node to the backup coordinator. The CAN message may further include: an acknowledgement (ACK) message, the protocol further including: a transmitting basic node transmitting a data message on the wireless communication medium; and upon the associated coordinator node correctly receiving the data message, the coordinator node transmitting an ACK message on the wireless communication medium, otherwise the basic node retransmitting the data message.

The protocol may further include: upon the associated coordinator node incorrectly receiving the data message after multiple retransmission attempts, the transmitting basic node requesting the backup coordinator node for the associated coordinator node to acknowledge the data message.

The protocol may further include: a transmitting coordinator node transmitting a data message on the wireless communication medium; and upon correctly receiving the data message from said coordinator node, the backup coordinator node for the coordinator node transmitting an ACK message on the wireless communication medium.

The protocol may further include: upon a coordinator node correctly receiving a data message from an associated basic node, the coordinator node caching the data message in memory, and retransmitting the data message to other nodes; and the coordinator node performing a message retransmission upon receiving an error message.

The protocol may further include: a basic node registering a desired data message identification with the associated coordinator node; upon said coordinator node receiving a data message with such identification, the coordinator node caching the data message in memory and transmitting the data message to the associated basic node until the associated basic node acknowledges proper receipt of the data message.

These and other features, aspects and advantages of the present invention will become understood with reference to the following description, appended claims and accompanying figures.

DETAILED DESCRIPTION OF THE INVENTION

The present invention provides a method and system implementing a wireless communication protocol for a wireless enhanced controller area network. This allows removal of communication and control wires/cables in a Controller Area Network (CAN).

CAN, as a wired communication standard, utilizes channel detection for medium access control. For example, if two or more CAN nodes begin transmitting messages at the same time, a CAN bus access conflict is resolved by non-destructive bitwise arbitration. Non-destructive means that a CAN node winning arbitration simply continues on with the message, without the message being destroyed or corrupted by a message from another CAN node. CAN defines a logic bit 0 as a dominant bit and a logic bit 1 as a recessive bit. A dominant bit always overwrites a recessive bit on a CAN bus.

Therefore, if two CAN nodes begin to transmit simultaneously, where a CAN node sends a zero (dominant) while the other CAN nodes send a one (recessive), the CAN node sending the zero obtains control of the CAN bus and goes on to complete its message. Each CAN node monitors the bus to ensure that the bit which that node is attempting to send actually appears on the CAN bus. A lower priority node may at some point attempt to send a recessive bit and the monitored state on the CAN bus may be a dominant bit. At that point, such a node loses arbitration and immediately stops transmitting.

Figure 1:
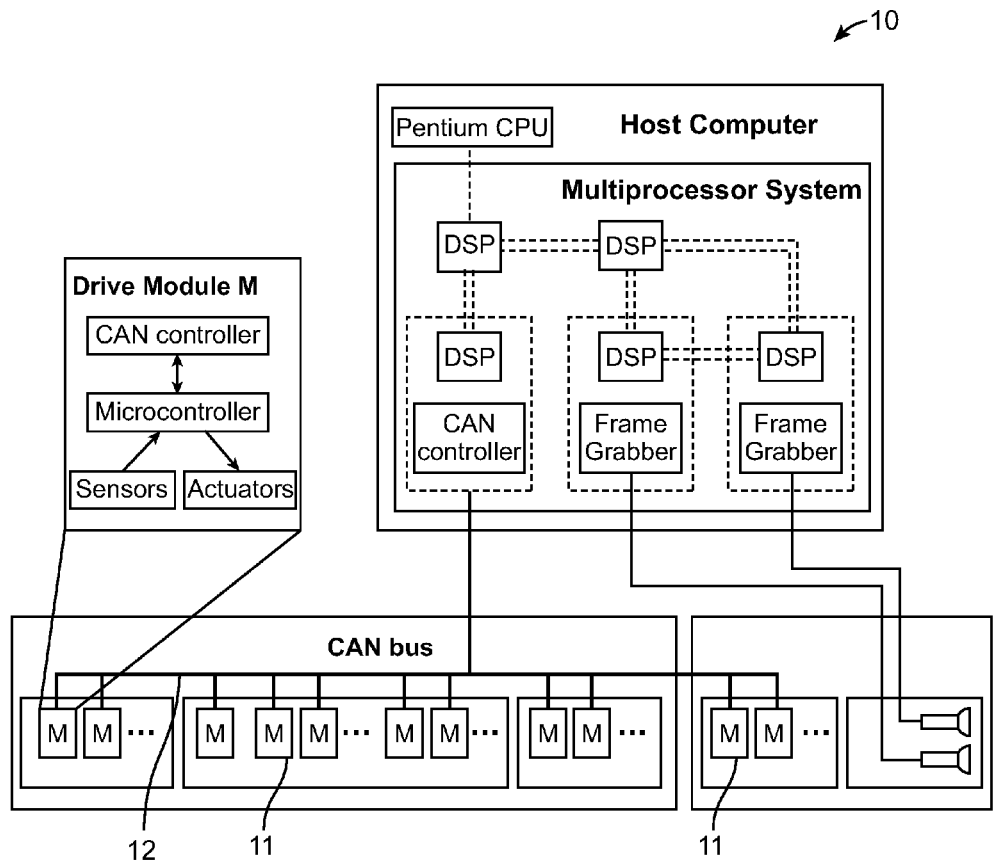
FIG. 1 shows a block diagram of a conventional wired control area network (CAN).
Figure 2:
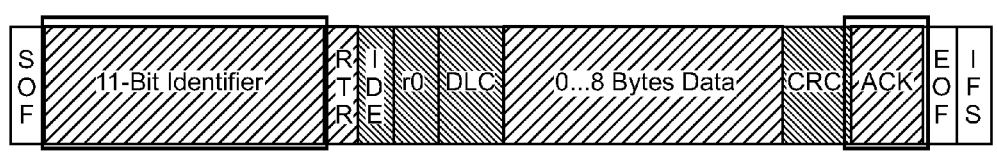
FIG. 2 shows the structure of a conventional content-identified CAN message.

FIG. 2 shows a content-identified CAN message, wherein the content of the message is named by an Identifier. Said Identifier does not indicate the destination of the CAN message, and rather describes the meaning of the Data in the CAN message. Each CAN node in the system/network may perform Message Filtering to determine whether the message Data is to be acted upon by that CAN node or not. As a consequence of Message Filtering, any number of CAN nodes can receive and simultaneously act upon the same CAN message.

CAN further defines a message acknowledgement mechanism and an error reporting mechanism to ensure reliable communications among CAN nodes. As shown in FIG. 2, an ACK field at the end of each CAN message 20 includes two bits containing an ACK SLOT and an ACK DELIMITER. A message sending (transmitting) CAN node sets two recessive bits in the ACK field of the message and sends the message over the CAN bus. A receiving CAN node which has received a valid message correctly over the CAB bus overwrites the recessive bit in the original ACK SLOT. The transmitting node checks if the ACK SLOT (which it has sent as a recessive bit) contains a dominant bit. This dominant bit indicates acknowledgement that at least one CAN node correctly received the message. If this bit is recessive, then no CAN node received the message properly.

When a CAN node detects an error in a message, it transmits an error frame, which causes all other CAN nodes in the network to send an error frame as well. The original CAN transmitting node then automatically retransmits the message. An active error frame comprises six dominant bits (violating the bit stuffing rule). This is interpreted as an error by all of the CAN nodes which then generate their own error frame. This means that an error frame can be from the original six bits to twelve bits long with all the replies. This error frame is then followed by a delimiter field of eight recessive bits and a bus idle period before the corrupted message is retransmitted.

Figure 3:
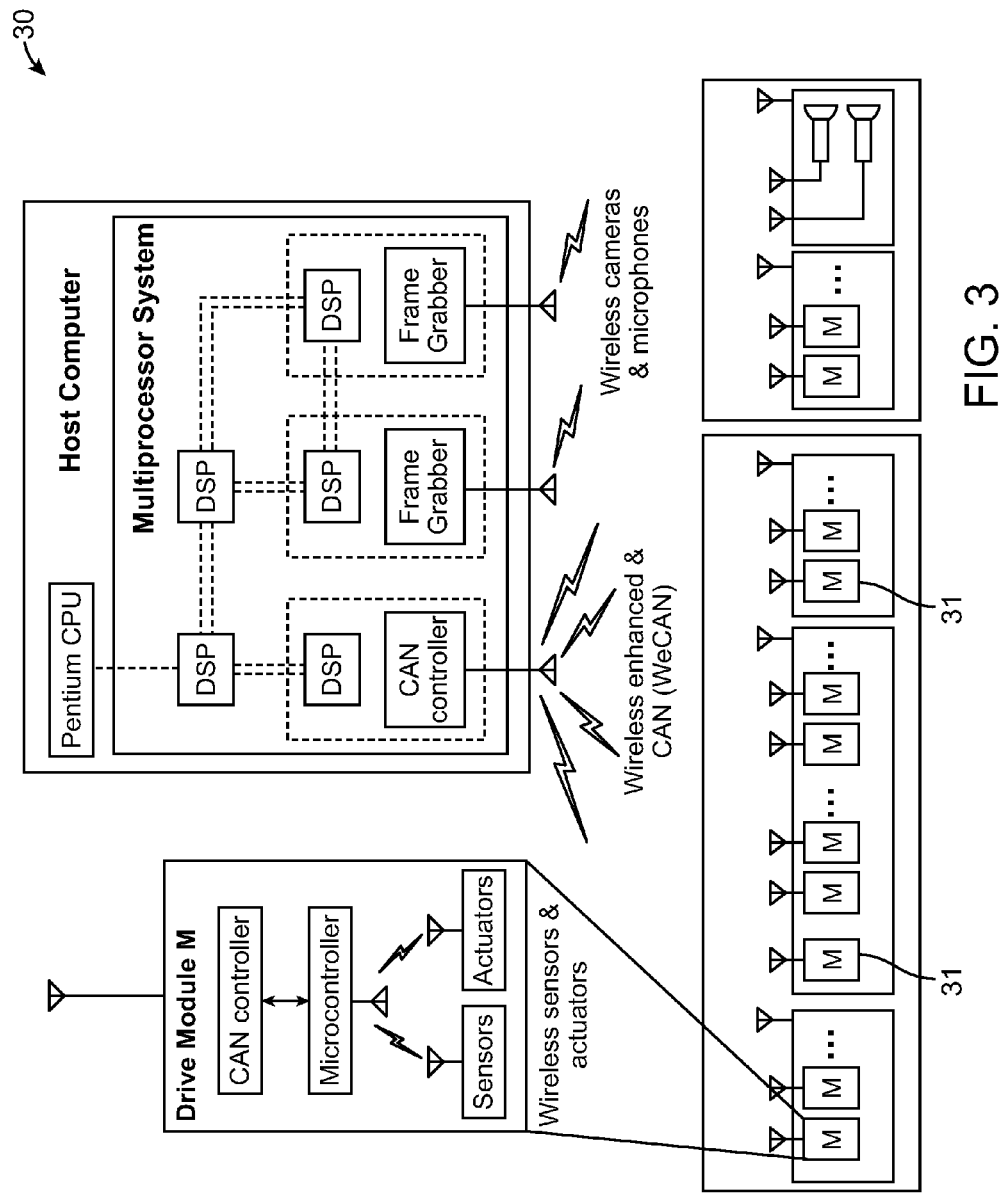
FIG. 3 shows a functional block diagram of a wireless enhanced control area network implementing a wireless communication protocol, according to an embodiment of the invention.

FIG. 3 shows an example wireless enhanced controller area network 30 including wireless controller area network nodes implementing a wireless communication protocol, according to an embodiment of the invention. In one embodiment, the wireless communication protocol enables transmission content-identified CAN messages in the wireless enhanced controller area network 30, for both a flat network and a two-level hierarchical network (particularly suitable for low-power nodes).

In a flat wireless network, all nodes (wireless stations comprising transceivers) are equally treated and have the same functionality. All nodes can reach other without going through any intermediary hardware devices. In a hierarchical network a coordinator node is wirelessly connected to one or more other nodes that are one level lower in the hierarchy (i.e., the second level), with a point-to-point wireless link between each of the second level nodes and the coordinator node. Each of the second level nodes may also have one or more other nodes that are one level lower in the hierarchy, etc. There may be multiple coordinators in the same level.

Since wireless transceivers cannot utilize channel detection to assist in communication medium access control, then bitwise arbitration, acknowledgement, and error reporting mechanisms defined in the CAN standard cannot be applied directly to a wireless enhanced controller area network. As such, in one implementation the invention provides error reporting and acknowledgment processes for reliable and efficient transmissions of CAN messages among the wireless CAN nodes 31. This enables wireless transmissions of content-identified CAN messages for seamless transmission between wired CAN and wireless CAN nodes.

In the example implementations described herein in relation to FIG. 3, all the wireless nodes 31 within the wireless enhanced controller area network 30 may adjust their wireless transmission ranges dynamically, with a maximum range covering the network 30. Carrier sense multiple access with collision avoidance (CSMA/CA) is used as the basic wireless medium access scheme for transmitting data, error, and acknowledgement (ACK) messages between the nodes 31. For compatibility with CAN, messages exchanged between nodes 31 in the network 30 need not carry destination address information. Instead, each message carries an ID indicating the type of the content of the message. An example ID is 10110010110 defined as "robot finger motor activation". When receiving the message with this ID, only the finger motor will process the message. The message ID may be specially protected to enable each receiving wireless CAN node to retrieve the ID from corrupted messages. Such protection may include use of error detection and correction encoding, known in the art. The nodes utilize the ID in a received message to determine how to process the message.

Figure 4:
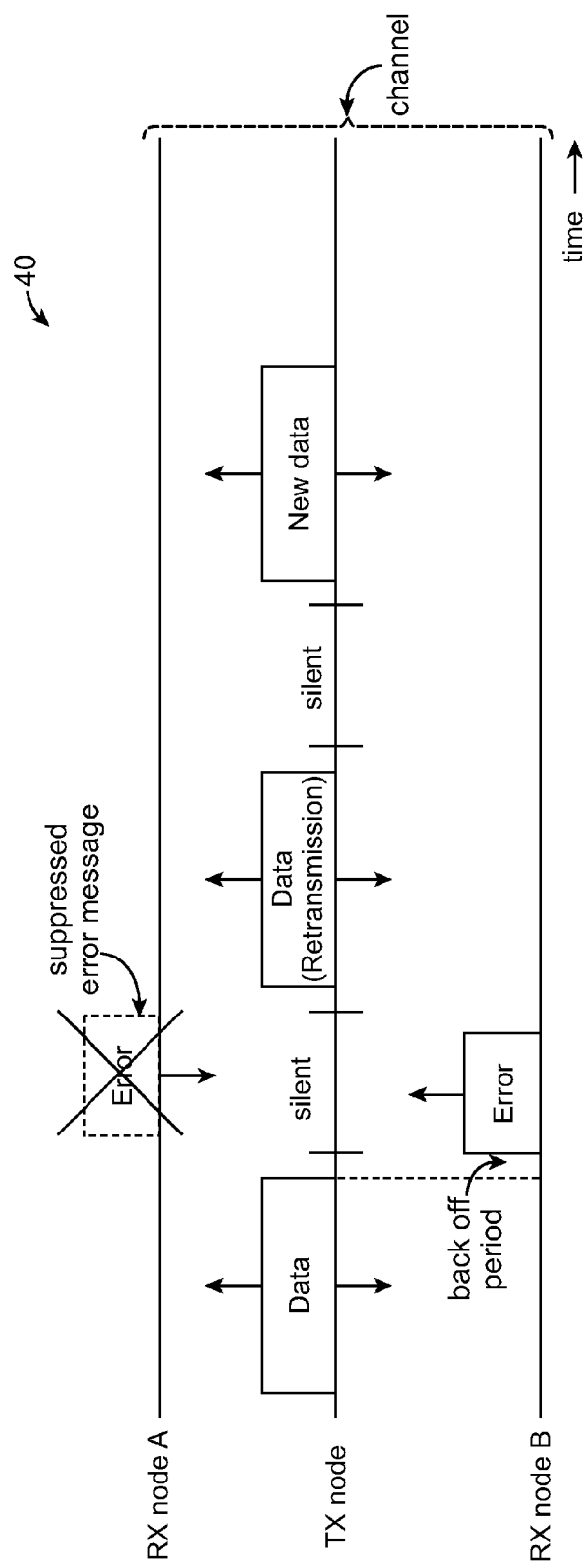
FIG. 4 shows an example channel access scenario based on the wireless communication protocol in a wireless enhanced control area network, according to an embodiment of the invention.

FIG. 4 shows an example communication protocol 40 for wireless medium access in a flat wireless enhanced controller area network, according to an embodiment of the invention. The communication protocols described herein may be implemented as Medium Access Control (MAC) layer components (MAC is data communication protocol sub-layer of the Data Link Layer in the seven-layer Open Systems Interconnection (OSI) model).

The wireless nodes in the network communicate information over a wireless communication medium (channel). This example involves a transmitting node (TX) and multiple receiving nodes (RX node A and RX node B). After a transmitting node (e.g., TX node) transmits a data message (data) over the channel, if a receiving node receives the message correctly (i.e., message is not corrupted), then the receiving node processes the message in a message filter (to determine whether the message is needed and stays silent. If a receiving node (e.g., RX node B) receives the message incorrectly, it backs off the channel a random time period (back off period) and then transmits an error message. The error message from one node (e.g., RX node B) suppresses the error messages from all other nodes (e.g., RX node A) The term "suppress" herein means that when a first RX node detects a busy medium and receives the error message from a second RX node, the first RX node does not send out its own error message. If two RX nodes send messages at the same time, it causes message collision, which is not desirable.

After completing a message transmission, the transmitting node enters a silent period during which if the transmitting node receives an error message, it is informed that one or multiple nodes have not received the data message correctly. Therefore, after the silent period the transmitting node retransmits the data message over the channel. If the transmitting node does not detect any activity on the channel after it completes a transmission, it assumes that the message is correctly received by all the other nodes. A transmitting node transmits and retransmits a message until all other nodes receive the message correctly. Then the transmitting node may transmit a new data message after a silent period.

Figure 5:
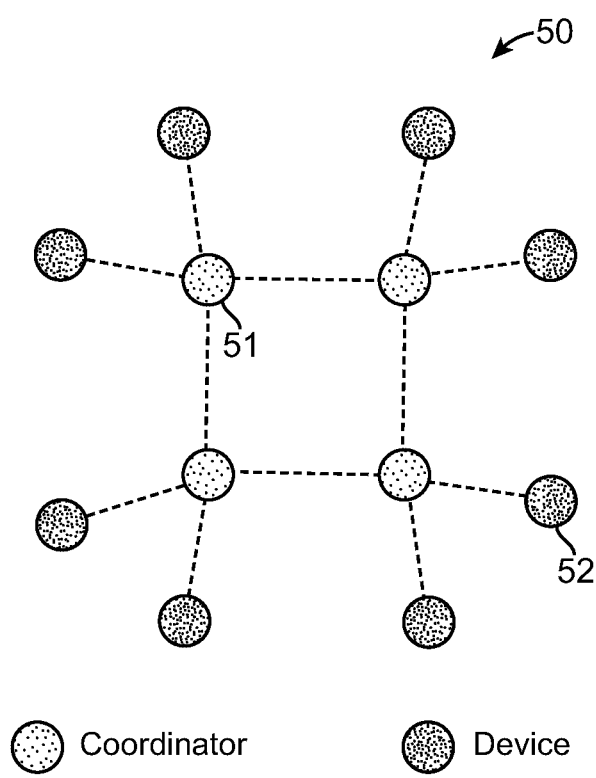
FIG. 5 shows a hierarchical architecture of a wireless enhanced control area network.

In another implementation, the present invention provides a wireless communication protocol for a hierarchical network such as a two-level hierarchical wireless enhanced control area network 50 as shown in FIG. 5, including wireless CAN nodes 51, 52. Wireless networks with many low power nodes are typically organized as a hierarchical structure.

There are two types of CAN nodes in the two-level hierarchical network 50: coordinator nodes 51 and device (or basic) nodes 52. Each coordinator node 51 comprises a wireless station rich in power, processing, and storage resources. Each device node 52 comprises a wireless station with limited resources in terms of power resources. In order to conserve power of transmitting device nodes 52, the coordinator nodes 51 upon receiving messages from low-power device nodes 52 may retransmit the messages to other nodes in the network 50. Such other nodes may include a node 52 that did not receive a message from another node 52 correctly.

When joining a wireless enhanced control area network 50, a device node 52 selects a coordinator node 51 and associates with that coordinator node. Each coordinator node 51 selects a backup coordinator node and forwards the information of its associated device nodes to its backup coordinator node.

Figure 6:
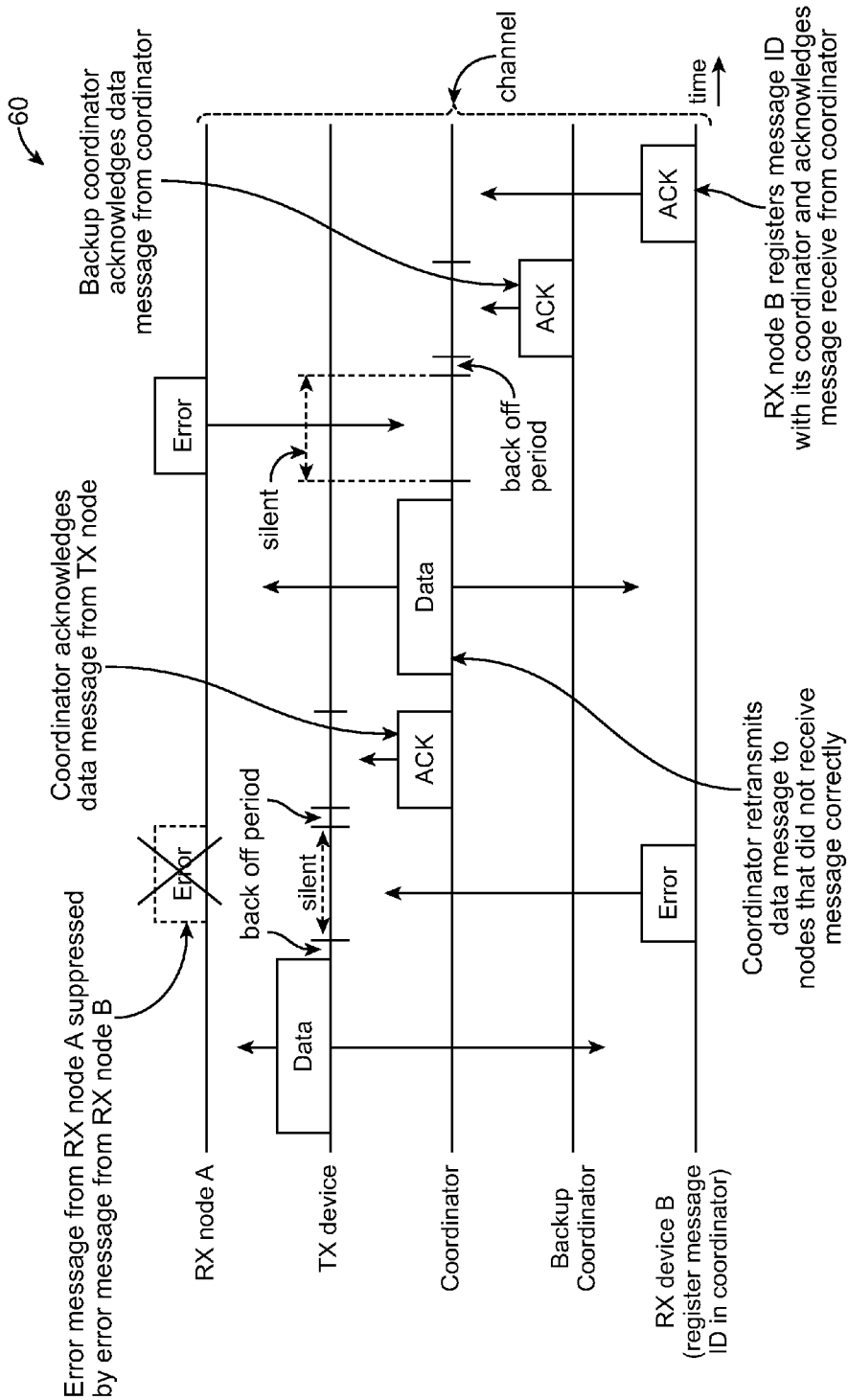
FIG. 6 shows an example channel access scenario based on the wireless communication protocol in a hierarchical wireless enhanced control area network, according to an embodiment of the invention.

The wireless enhanced control area network protocol further implements positive acknowledgment based on the coordinator nodes, as follows. FIG. 6 shows an example communication protocol 60 for wireless medium access in a two-level hierarchical wireless enhanced controller area network, according to an embodiment of the invention. This example involves a transmitting node (TX) and multiple receiving nodes (RX node A and RX node B), a coordinator node and a backup coordinator node.

A transmitting node ensures that its data messages are correctly received, at least, by its associated coordinator and/or backup coordinator. If the transmitting node is a device node 52, then its associated coordinator node acknowledges (ACK) correctly received messages from that device node 52. If the transmitting node does not receive ACK messages from its associated coordinator node after several retransmit attempts at sending messages, the transmitting node may request the backup coordinator for the associated coordinator node to acknowledge the message. If the transmitting node is a coordinator node 51, then its backup coordinator acknowledges correctly received messages from the coordinator node. Compared to an approach relying only on error reporting, the positive acknowledgement from a receiver node adds a level of assurance to reliable message delivery in the network 50.

If a receiving node (e.g., RX node B) receives the message incorrectly, it backs off the channel a random time period (back off period) and then transmits an error message. The error message from one node (e.g., RX node B) suppresses the error messages from all other nodes (e.g., RX node A).

The wireless enhanced control area network protocol implements message ID prescreening as follows. When a receiving node (coordinator 51 or device 52) receives a corrupted message, it attempts to retrieve the message ID from the message in order to determine if it should act on the message. If the message is not desired by the receiving node, then the receiving node discards the message silently. If the corrupted message is desired by the receiving node or the receiving node cannot retrieve the message ID successfully, then the receiving node sends an error message after the wireless communication channel becomes idle. The message ID prescreening may prevent unnecessary message transmissions. The error reporting mechanism for the hierarchical network is similar to that of the flat network.

Once a coordinator node receives a data message correctly from an associated device node, the coordinator node caches the message, and takes on the responsibility to retransmit the message to the other nodes (such as nodes that may not have received the message correctly). The coordinator node continues retransmissions until no error message is received by it.

A device node (e.g., RX node B) may register its desired message IDs in its associated coordinator node. Once the coordinator node receives messages with such IDs, the coordinator node caches the messages in memory and continues transmitting the messages (either continuously or periodically) to the associated device node until the associated device nodes acknowledges proper receipt of these messages. This is useful, for example, when a device node enters sleep (e.g., power saving mode) frequently, but wishes to capture desired messages upon waking up.

Figure 7:
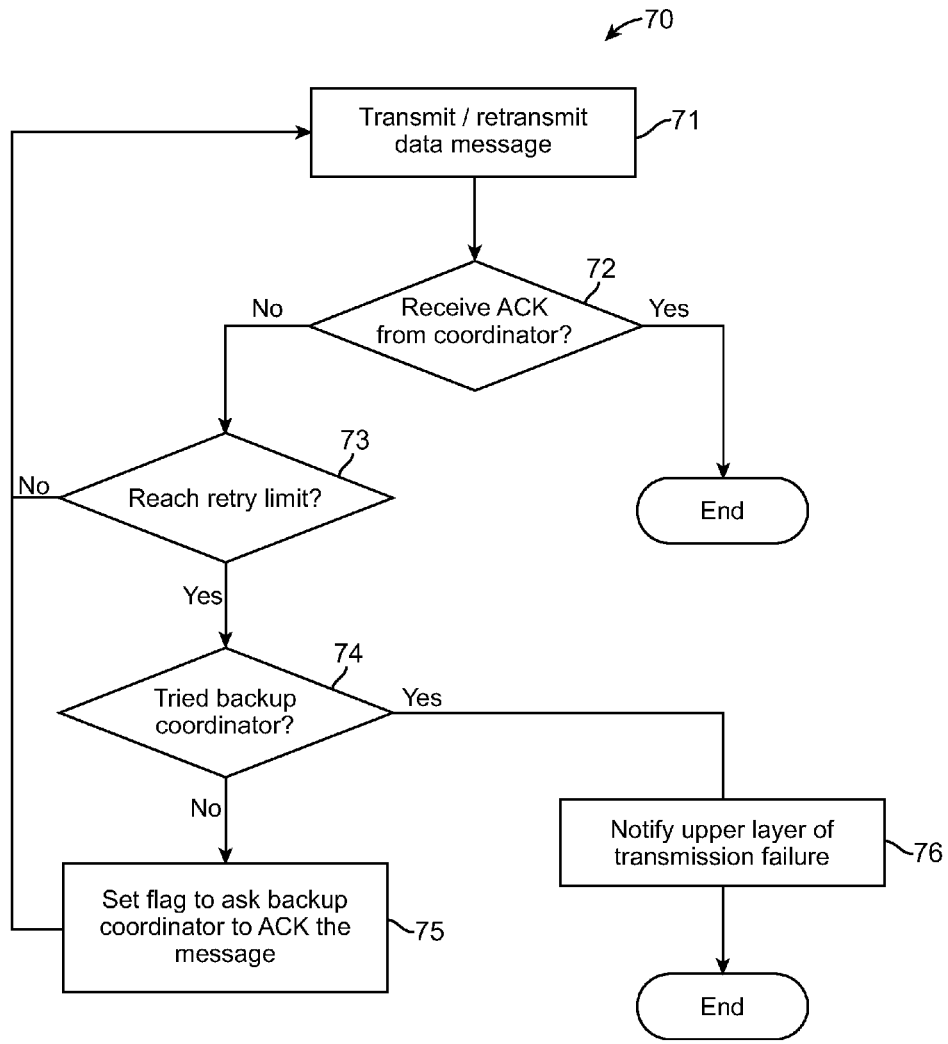
FIG. 7 shows a flowchart of a communication protocol for wireless medium access implemented by a transmitting device node in a wireless enhanced controller area network, according to an embodiment of the invention.

FIG. 7 shows a flowchart of a communication protocol 70 for wireless medium access implemented by a transmitting device node (TX) in a wireless enhanced controller area network, according to an embodiment of the invention. The protocol 70 may be implemented based on the following processing blocks:

Block 71: Transmit/retransmit data message on wireless channel.

Block 72: Receive ACK from associated coordinator node? If not, proceed to block 73, else End.

Block 73: Transmit retry limit reached? If not, proceed to block 71, else proceed to block 74.

Block 74: Tried receiving ACK from associated backup coordinator? If not, proceed to block 75, else proceed to block 76.

Block 75: Set flag to ask backup coordinator to ACK the data message. Proceed to block 71.

Block 76: Notify upper layer of transmission failure. End.

Figure 8:
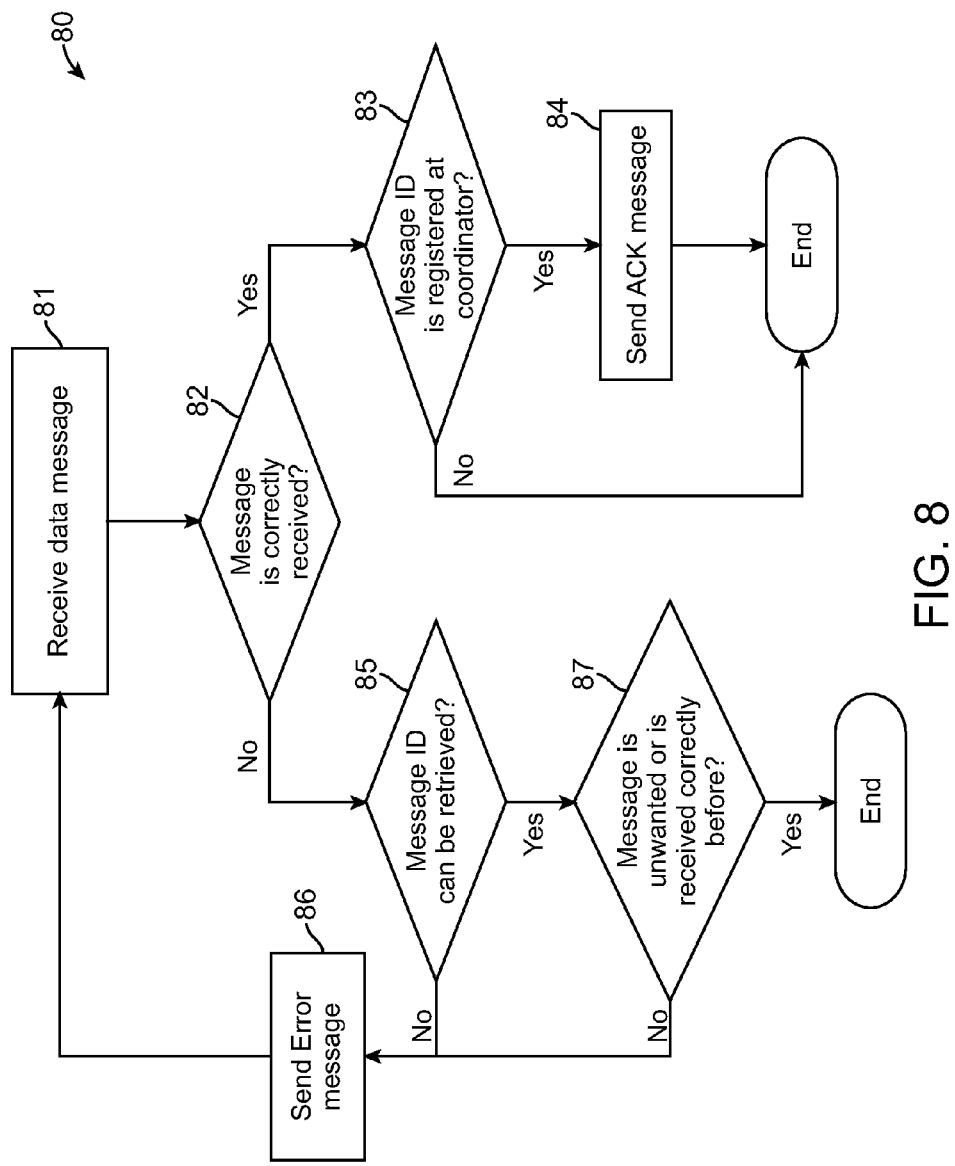
FIG. 8 shows a flowchart of a communication protocol for wireless medium access implemented by a receiving device node in a wireless enhanced controller area network, according to an embodiment of the invention.

FIG. 8 shows a flowchart of a communication protocol 80 for wireless medium access implemented by a receiver device node (RX) in a wireless enhanced controller area network, according to an embodiment of the invention. The protocol 80 may be implemented based on the following processing blocks:

Block 81: Receive data message.

Block 82: Data message is correctly received? If yes, proceed to block 83, else proceed to block 85.

Block 83: Data message ID is registered at associated coordinator node? If yes, proceed to block 84, else END.

Block 84: Send ACK message. End.

Block 85: Data message ID can be retrieved? If yes, proceed to block 87, else proceed to block 86.

Block 86: Send error message, proceed to block 81.

Block 87: Data message is unwanted or is received correctly before? If not, proceed to block 86, else End.

Figure 9:
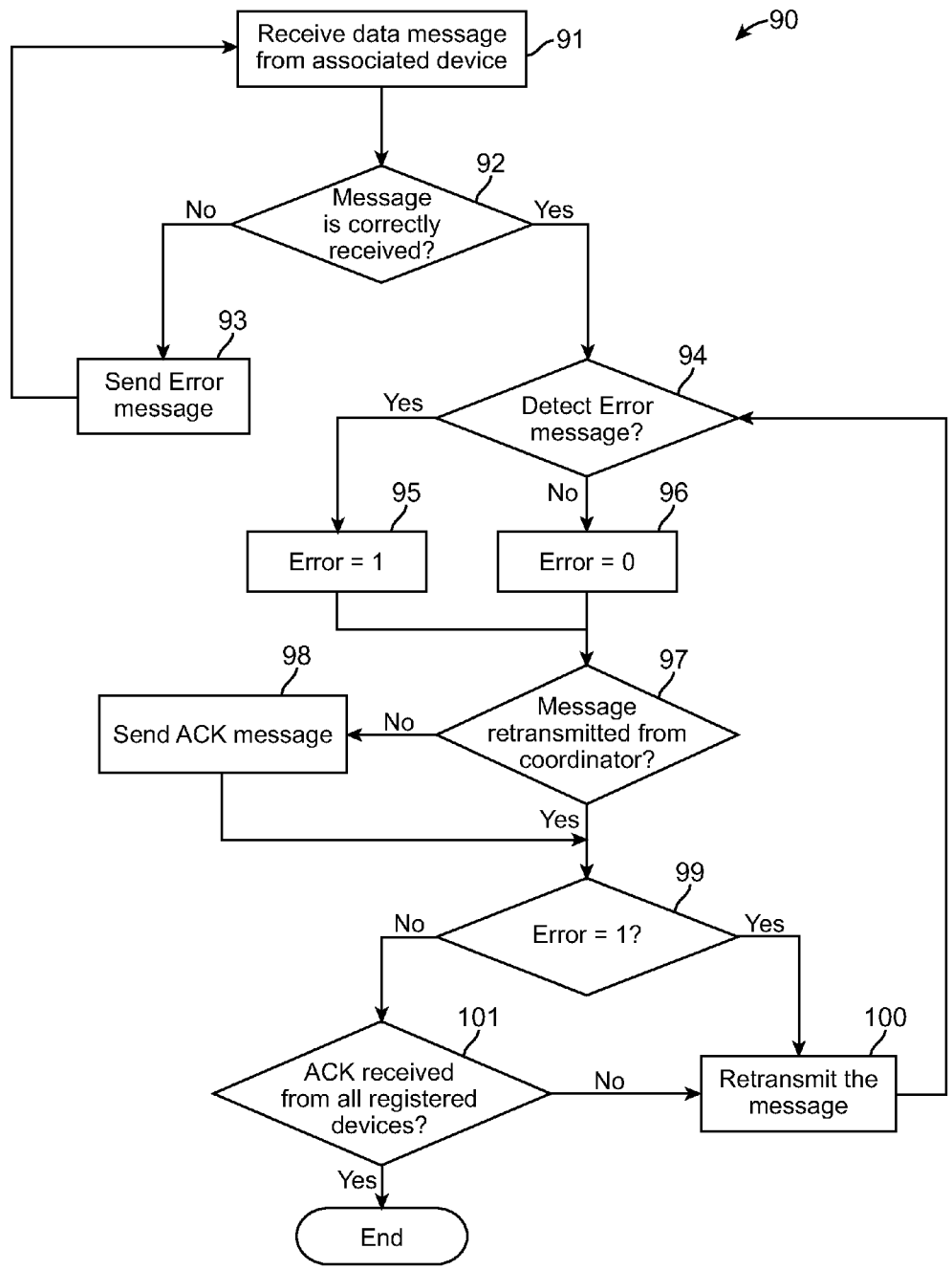
FIG. 9 shows a flowchart of a communication protocol for wireless medium access implemented by a coordinator node in a hierarchical wireless enhanced controller area network, according to an embodiment of the invention.

FIG. 9 shows a flowchart of a communication protocol 90 for wireless medium access implemented by a coordinator node in a wireless enhanced controller area network, according to an embodiment of the invention. The protocol 90 may be implemented based on the following processing blocks:

Block 91: Receive data message from an associated device node.

Block 92: Data message is correctly received? If yes, proceed to block 94, else proceed to block 93.

Block 93: Send error message. Proceed to block 91.

Block 94: Detect error message? If yes, proceed to block 95, else proceed to block 96.

Block 95: Set Error=1. Proceed to block 97.

Block 96: Set Error=0. Proceed to block 97.

Block 97: Data message retransmitted from coordinator? If no, proceed to block 98, else proceed to block 99.

Block 98: Send ACK message. Proceed to block 99.

Block 99: Is Error=1? If yes, proceed to block 100, else proceed to block 101.

Block 100: Retransmit the data message. Proceed to block 94.

Block 101: ACK received from all registered devices? If not, proceed to block 100, else End.

Figure 10:
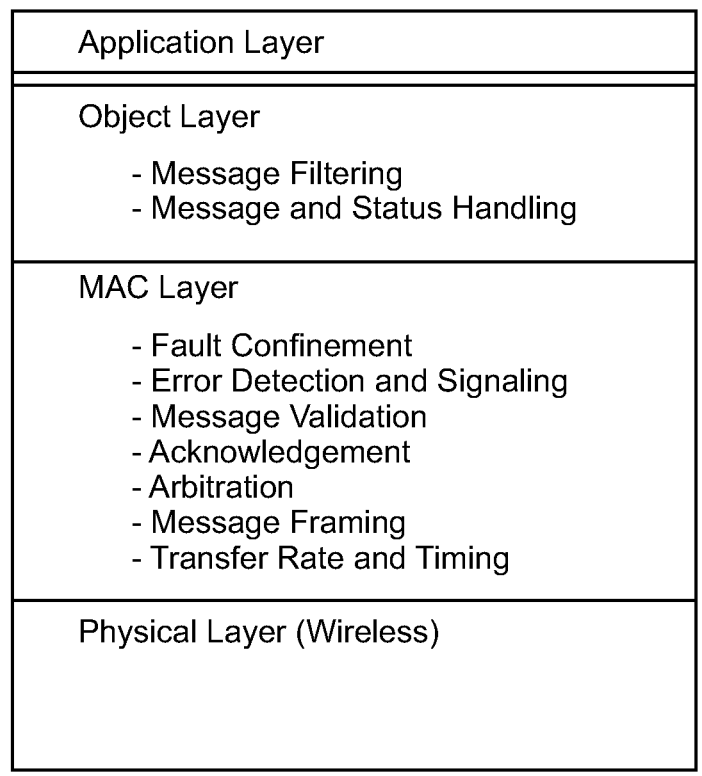
FIG. 10 shows an example protocol stack for Wireless Enhanced Controller Area Networks (WeCAN).

Each node 31 is able to send and receive messages. The devices that are connected by a wireless enhanced CAN network are typically sensors, actuators and control devices. Each wireless node 31 (FIG. 3) may comprise a wireless sensor, an actuator module, a microcontroller and a WeCAN controller with a wireless communication protocol stack (including PHY, MAC, Object layer and Application layer). The wireless node 31 implements one or more of said communication protocols (e.g., FIGS. 7-9) for wireless medium access in a wireless enhanced controller area network. FIG. 10 shows a protocol stack of a WeCAN protocol including a MAC layer and a wireless PHY layer.

Figure 11:
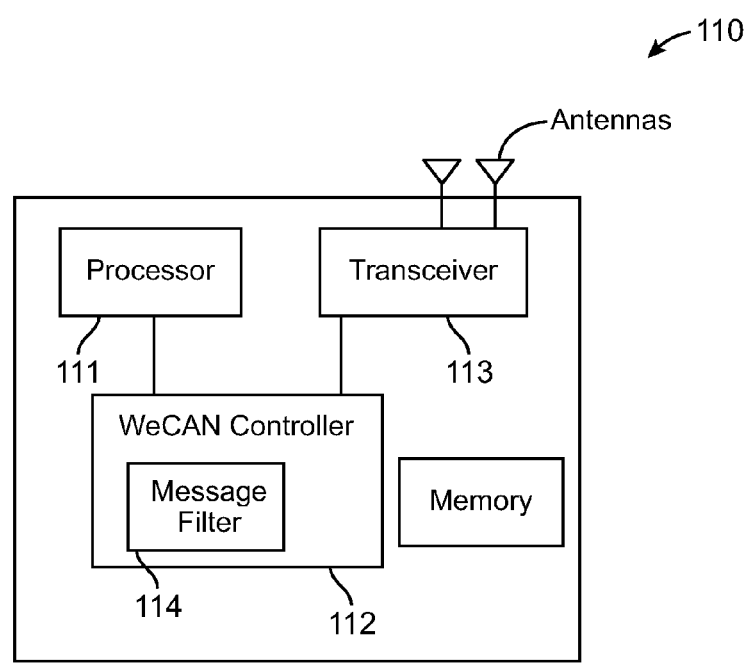
FIG. 11 shows a functional block diagram for a wireless node in a wireless enhanced controller area network, according to an embodiment of the invention.

FIG. 11 shows another example of a wireless node wireless enhanced control area network, implementing one or more of said communication protocols (e.g., FIGS. 7-9) for wireless medium access in a wireless enhanced controller area network.

The wireless node (device node, coordinator node) 110 in a wireless enhanced control area network may comprise a node processor 111 configured to determine what received messages mean, and which messages to transmit. The wireless node 110 further includes a WeCAN controller 112 with a wireless communication protocol stack (including PHY, MAC, Object layer and Application layer), wherein the WeCAN controller implements a message filter 114 that determines whether a message is wanted/needed. The wireless node 110 further includes a wireless transceiver 113 for exchanging information (such as messages) in the wireless network, under the control of the node processor 111. The node processor 111 implements said wireless enhanced control area network protocol according to embodiments of the present invention. Wireless sensors, actuators and control devices can be wirelessly connected to each node 110.

As is known to those skilled in the art, the aforementioned example architectures described above, according to the present invention, can be implemented in many ways, such as program instructions for execution by a processor, as software modules, microcode, as computer program product on computer readable media, as logic circuits, as application specific integrated circuits, as firmware, etc. Further, embodiments of the invention can take the form of an entirely hardware embodiment, an entirely software embodiment or an embodiment containing both hardware and software elements.

The terms "computer program medium," "computer usable medium," "computer readable medium", and "computer program product," are used to generally refer to media such as main memory, secondary memory, removable storage drive, a hard disk installed in hard disk drive, and signals. These computer program products are means for providing software to the computer system. The computer readable medium allows the computer system to read data, instructions, messages or message packets, and other computer readable information from the computer readable medium. The computer readable medium, for example, may include non-volatile memory, such as a floppy disk, ROM, flash memory, disk drive memory, a CD-ROM, and other permanent storage. It is useful, for example, for transporting information, such as data and computer instructions, between computer systems. Furthermore, the computer readable medium may comprise computer readable information in a transitory state medium such as a network link and/or a network interface, including a wired network or a wireless network, that allow a computer to read such computer readable information. Computer programs (also called computer control logic) are stored in main memory and/or secondary memory. Computer programs may also be received via a communications interface. Such computer programs, when executed, enable the computer system to perform the features of the present invention as discussed herein. In particular, the computer programs, when executed, enable the processor multi-core processor to perform the features of the computer system. Accordingly, such computer programs represent controllers of the computer system.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Though the present invention has been described with reference to certain versions thereof, however, other versions are possible. Therefore, the spirit and scope of the appended claims should not be limited to the description of the preferred versions contained herein.

What is claimed is:

1. A method of communication in a wireless enhanced control area network including wireless station nodes, the method comprising:
   communicating control area network (CAN) messages among one or more wireless station nodes on a wireless communication medium using a wireless communication protocol, wherein each CAN message comprises a content-identified data message or an error message, each content-identified CAN message including an identification indicating the content type of the message for message filtering to determine processing of the message;
   controlling access to the wireless communication medium by one or more wireless station nodes based on a medium access control protocol, including: transmitting a data message on the wireless communication medium;
   upon correct reception of the data message, utilizing a message filter to determine processing of the message based on the message identification;
   upon incorrect reception of the data message, backing off the wireless communication medium a random time period and then transmitting an error message on the wireless communication medium; and
   upon completing a data message transmission and correct reception of the data message, transmitting a previously received data message after a silent period.

2. The method of claim 1 wherein an error message from a wireless station node suppresses error messages from all other wireless station nodes.

3. The method of claim 2, further comprising upon completing a data message transmission, entering a silent period by a transmitting wireless station node during which if the transmitting wireless station node receives an error message, then after the silent period retransmitting the data message over the wireless communication medium by the transmitting wireless station node, otherwise deciding by the transmitting wireless station node that the data message was received correctly by receiving wireless station nodes.

4. The method of claim 3,
   wherein the data message is retransmitted by the transmitting wireless station node until all other wireless station nodes receive the message correctly;
   wherein the transmitting wireless station node is a coordinator node, and once the coordinator node receives the data message correctly, the data message is cached for retransmitting the data message to other wireless station nodes.

5. The method of claim 3 wherein the network comprises a hierarchical network wherein the wireless station nodes include coordinator nodes and basic nodes, the method further comprising:
   associating by a basic node with a coordinator node; and
   upon receiving a message from an associated basic node, waiting for a silent period for receiving an error message, and upon not receiving an error message, retransmitting the message to other wireless station nodes in the network by said coordinator node.

6. The method of claim 5 further comprising:
   selecting a backup coordinator node by said coordinator node; and
   passing information of each associated basic node to the backup coordinator node by said coordinator node.

7. The method of claim 6 wherein the CAN message may further comprise an acknowledgement (ACK) message, the method further comprising:
   transmitting a data message on the wireless communication medium by a basic node; and
   upon the associated coordinator node correctly receiving the data message, transmitting an ACK message on the wireless communication medium by the coordinator node, otherwise retransmitting the data message by the basic node.

8. The method of claim 7, further comprising:
   upon the associated coordinator node incorrectly receiving the data message after multiple retransmission attempts, requesting the backup coordinator node for the associated coordinator node to acknowledge the data message by the basic node.

9. The method of claim 7, further comprising:
   transmitting a data message on the wireless communication medium by a coordinator node; and
   upon correctly receiving the data message from said coordinator node, transmitting an ACK message on the wireless communication medium by the backup coordinator node for the coordinator node.

10. The method of claim 7, further comprising:
upon the coordinator node correctly receiving a data message from the associated basic node, caching the data message in memory by the coordinator node, and retransmitting the data message to other wireless station nodes; and
performing a message retransmission upon receiving an error message by the coordinator node.

11. The method of claim 7, further comprising:
registering a desired data message identification with the associated coordinator node by the basic node;
upon said coordinator node receiving a data message with such identification, caching the data message in memory by the coordinator node; and
transmitting the data message from the coordinator node to the associated basic node until the associated basic node acknowledges proper receipt of the data message.

12. A wireless enhanced control area network, comprising:
wireless station nodes configured for wireless communication on a wireless communication medium, each wireless station node including a processor, a wireless communication control area network controller implementing a message filter, and a wireless transceiver;
each wireless station node configured for employing a wireless communication protocol for wireless communication of control area network (CAN) messages via the wireless transceiver, wherein each CAN message comprises a content-identified data message or an error message, each content-identified CAN message including an identification indicating the content type of the message for message filtering to determine processing of the message;
the wireless communication protocol including a medium access control protocol for controlling access to the wireless communication medium by the wireless station nodes, wherein a transmitting wireless station node is configured for transmitting a data message on the wireless communication medium, and upon a receiving wireless station node receiving the data message correctly, then the receiving wireless station node utilizing a message filter to determine processing of the message based on the message identification; and
the wireless station nodes are further configured according to the wireless communication protocol for:
upon the receiving wireless station node receiving the data message incorrectly, the receiving wireless station node backing off the wireless communication medium a random time period and then transmitting an error message on the wireless communication medium;
wherein upon completing the data message transmission and correct reception of the data message, the transmitting wireless station node transmits the previously received data message after a silent period.

13. The network of claim 12 wherein an error message from a wireless station node suppresses error messages from all other wireless station nodes.

14. The network of claim 13 wherein the wireless station nodes are further configured according to the wireless communication protocol for:
upon completing the data message transmission, the transmitting wireless station node entering a silent period during which if the transmitting wireless station node receives an error message, then after the silent period the transmitting wireless station node retransmits the data message over the wireless communication medium, otherwise the transmitting wireless station node deciding that the data message was received correctly by receiving wireless station nodes;
wherein the transmitting wireless station node comprises a coordinator node, and once the coordinator node receives the data message correctly, the data message is cached and the coordinator node retransmits the data message until all other wireless station nodes receive the data message correctly.

15. The network of claim 12 wherein the network comprises a hierarchical network wherein the wireless station nodes include coordinator nodes and basic nodes, the wireless station nodes are further configured according to the wireless communication protocol for:
a basic node associating with a coordinator node;
upon receiving a message from an associated basic node, waiting for a silent period for receiving an error message, and upon not receiving an error message said coordinator node retransmitting the message to other wireless station nodes in the network;
said coordinator selecting a backup coordinator node; and
said coordinator passing information of each associated basic node to the backup coordinator node.

16. The network of claim 15 wherein the CAN message may further include an acknowledgement (ACK) message, and the wireless station nodes are further configured according to the wireless communication protocol for:
a basic node transmitting a data message on the wireless communication medium;
upon the associated coordinator node correctly receiving the data message, the coordinator node transmitting an ACK message on the wireless communication medium, otherwise the basic node retransmitting the data message; and
upon the associated coordinator node incorrectly receiving the data message after multiple retransmission attempts, the basic node requesting the backup coordinator node for the associated coordinator node to acknowledge the data message.

17. The network of claim 16 wherein the nodes are further configured according to the wireless communication protocol for:
a coordinator node transmitting a data message on the wireless communication medium; and
upon correctly receiving the data message from said coordinator node, the backup coordinator node for the coordinator node transmitting an ACK message on the wireless communication medium.

18. The network of claim 16 wherein the nodes are further configured according to the wireless communication protocol for:
upon a coordinator node correctly receiving a data message from an associated basic node, the coordinator node caching the data message in memory, and retransmitting the data message to other wireless station nodes;
the coordinator node performing a message retransmission upon receiving an error message;
a basic node registering a desired data message identification with the associated coordinator node;
upon said coordinator node receiving a data message with such identification, the coordinator node caching the data message in memory and transmitting the data message to the associated basic node until the associated basic node acknowledges proper receipt of the data message; and employing Carrier Sense Multiple Access with Collision Avoidance (CSMA/CA) for wireless medium access control for transmitting data, error, and acknowledgement messages between the wireless station nodes.

19. A wireless station node for communication on a wireless communication medium in an enhanced control area network, comprising:
   a processor, a wireless communication control area network controller, and a wireless transceiver;
   the wireless communication control area network controller configured for employing a message filter and a communication protocol for wireless communication of control area network (CAN) messages via the wireless transceiver, wherein each CAN message comprises a content-identified data message or an error message, each content-identified CAN message including an identification indicating the content type of the message for message filtering to determine processing of the message;
   the wireless communication protocol including a medium access control protocol for controlling access to the wireless communication medium by the wireless station node, wherein a transmitting wireless station node is configured for transmitting a data message on the wireless communication medium, and upon a receiving wireless station node receiving the data message correctly, then the receiving wireless station node utilizing a message filter to determine processing of the data message based on the message identification; and
   wherein the wireless communication control area network controller is further configured according to the wireless communication protocol for:
   upon receiving the data message incorrectly, the receiving wireless station node backing off the wireless communication medium a random time period and then transmitting an error message on the wireless communication medium,
   wherein upon completing the data message transmission and correct reception of the data message, the transmitting wireless station node transmitting the previously received data message after a silent period.

20. The wireless station node of claim 19 wherein an error message from a node suppresses error messages from all other wireless station nodes.

21. The wireless station node of claim 19 wherein the wireless communication control area network controller is further configured according to the wireless communication protocol for:
   upon completing a data message transmission, the wireless station node entering a silent period during which if the wireless station node receives an error message, then after the silent period the wireless station node retransmits the data message over the wireless communication medium, otherwise the wireless station node decides that the data message was received correctly by receiving wireless station nodes;
   wherein the transmitting wireless station node retransmits the previously received data message until all other wireless station nodes receive the data message correctly.

22. The wireless station node of claim 21 wherein the network comprises a hierarchical network for coordinator nodes and basic nodes, the wireless station node configured according to the wireless communication protocol as a coordinator node for:
   establishing association with a basic node, and upon receiving a message from an associated basic node, waiting for a silent period for receiving an error message, and upon not receiving an error message said coordinator node retransmitting the message to other wireless station nodes in the network;
   said coordinator node selecting a backup coordinator node; and
   said coordinator node passing information of each associated basic node to the backup coordinator node.

23. The wireless station node of claim 22 wherein the CAN message may further include an acknowledgement (ACK) message, said coordinator node further configured according to the wireless communication protocol for:
   the coordinator node receiving a data message transmitted by an associated basic node on the wireless communication medium, and upon correctly receiving the data message, the coordinator node transmitting an ACK message on the wireless communication medium, otherwise the basic node retransmitting the data message; and
   upon the associated coordinator node incorrectly receiving the data message after multiple retransmission attempts, the transmitting basic node requesting the backup coordinator node for the associated coordinator node to acknowledge the data message.

24. The wireless station node of claim 23 wherein said coordinator node is further configured according to the wireless communication protocol for:
   the coordinator node transmitting a data message on the wireless communication medium, wherein upon correctly receiving the data message from said coordinator node, a backup coordinator node for the coordinator node transmits an ACK message on the wireless communication medium.

25. The wireless station node of claim 24 wherein said coordinator node is further configured according to the wireless communication protocol for:
   upon the coordinator node correctly receiving a data message from an associated basic node, after a silent period, the coordinator node caching the data message in memory, and retransmitting the cached data message to other wireless station nodes;
   the coordinator node performing a message retransmission upon receiving an error message, such that a basic node registers a desired data message identification with the associated coordinator node;
   upon the coordinator node receiving a data message with such identification, the coordinator node caching the data message in memory and transmitting the data message to the associated basic node until the associated basic node acknowledges proper receipt of the data message; and
   employing Carrier Sense Multiple Access with Collision Avoidance (CSMA/CA) for wireless medium access control for transmitting data, error, and acknowledgement messages between the wireless station nodes.

26. A wireless enhanced control area network, comprising:
   wireless station nodes configured for employing a wireless communication protocol for wireless communication of control area network (CAN) messages via a wireless transceiver, wherein each CAN message comprises a content-identified data message or an error message, each content-identified CAN message including an identification indicating the content type of the message for message filtering to determine processing of the message;
   the wireless communication protocol including a medium access control protocol for controlling access to the wireless communication medium by the wireless station nodes, wherein a transmitting wireless station node is configured for transmitting a data message on the wireless communication medium, and upon a receiving wireless station node receiving the data message correctly, then the receiving wireless station node utilizing a message filter to determine processing of the data message based on the data message identification;

wherein upon completing the data message transmission, a transmitting wireless station node entering a silent period during which if the transmitting wireless station node receives an error message and is informed that one of the wireless station nodes has not received the data message correctly, then after the silent period the transmitting wireless station node retransmits the data message over the wireless communication medium, wherein the network comprises a hierarchical network for coordinator nodes and basic nodes, the transmitting wireless station node configured according to the wireless communication protocol as a coordinator node for establishing association with a basic node, wherein said coordinator node selecting a backup coordinator node and passing information of each associated basic node to the backup coordinator node, wherein the transmitting node transmits and retransmits the data message until all other wireless station nodes receive the data message correctly, then the transmitting wireless station node transmits a new data message after another silent period.

27. The wireless enhanced control area network of claim 26, wherein upon receiving a message from an associated basic node, said coordinator node retransmitting the message to other wireless station nodes in the network.

28. A wireless station node, comprising:

a wireless communication control area network controller that employs a message filter and a wireless communication protocol for wireless communication of control area network (CAN) messages via a wireless transceiver, the wireless communication protocol including a medium access control (MAC) protocol for controlling access to a wireless communication medium by the wireless station node, wherein a transmitting wireless station node transmits a data message on the wireless communication medium, wherein the wireless communication control area network controller is configured according to the wireless communication protocol for:

upon receiving a data message incorrectly, a receiving wireless station node backing off the wireless communication medium a random time period and then transmitting an error message on the wireless communication medium, wherein upon completing the data message transmission and correct reception of the data message, the transmitting wireless station node transmitting the previously received data message after a silent period.

* * * * *